(12) United States Patent
Schierholz et al.

(10) Patent No.: US 6,331,072 B1
(45) Date of Patent: Dec. 18, 2001

(54) CONTINUOUS, CHAOTIC CONVECTION MIXER, HEAT EXCHANGER AND REACTOR

(75) Inventors: Wilfried Schierholz, Hocheim; Götz Lauschke, Frankfurt; Stefan Ott, Oberneisen; Ulrich Schmidt, Flörsheim; Peter Hein, Friedberg, all of (DE)

(73) Assignee: Axiva GmbH (DE)

( * ) Notice: Subject to any disclaimer, the term of this patent is extended or adjusted under 35 U.S.C. 154(b) by 0 days.

(21) Appl. No.: 09/463,348

(22) PCT Filed: Jul. 22, 1998

(86) PCT No.: PCT/EP98/04607
§ 371 Date: Jun. 8, 2000
§ 102(e) Date: Jun. 8, 2000

(87) PCT Pub. No.: WO99/04892
PCT Pub. Date: Feb. 4, 1999

(30) Foreign Application Priority Data

Jul. 24, 1997 (DE) .............................. 197 31 891
Jul. 11, 1998 (DE) .............................. 198 31 247

(51) Int. Cl.$^7$ ..................................... B01F 5/00
(52) U.S. Cl. ........................... 366/338; 138/177; 165/163
(58) Field of Search ...................... 366/181.5, 336, 366/338, 341, 339; 138/177, DIG. 11; 165/109.1, 163, 177; 72/369; 422/224, 225

(56) References Cited

U.S. PATENT DOCUMENTS

| | | |
|---|---|---|
| 2,143,287 * | 1/1939 | Smith . |
| 2,508,247 * | 5/1950 | Giauque . |
| 3,335,790 * | 8/1967 | Aranyi et al. . |
| 3,459,377 * | 8/1969 | Van Der Hulse . |
| 4,275,177 * | 6/1981 | Walkenhorst et al. . |
| 4,314,606 * | 2/1982 | Muller et al. .................. 165/163 |
| 4,347,894 * | 9/1982 | Gerlach ........................ 165/163 |
| 4,410,281 | 10/1983 | Crookes . |
| 4,422,773 | 12/1983 | Cassaday et al. . |
| 4,599,773 | 7/1986 | Sievers . |
| 6,119,769 * | 9/2000 | Yu et al. . |

FOREIGN PATENT DOCUMENTS

| | | | |
|---|---|---|---|
| 684285 * | 4/1964 | (CA) | ........................ 165/163 |
| 2763868 | 12/1998 | (FR) . | |
| 426885 * | 4/1935 | (GB) | ........................ 165/177 |
| 94/12270 | 6/1994 | (WO) . | |

* cited by examiner

*Primary Examiner*—Charles E. Cooley
(74) *Attorney, Agent, or Firm*—Connolly Bove Lodge & Hutz LLP (57) ABSTRACT

Continuous, chaotic convection mixer, convection heat exchanger and convection reactor The invention relates to a device (1), in particular for mixing, for heat exchange or for carrying out reactions, having one or more through-flow elements (2) which have a center line (3) in the direction of flow, wherein the element(s) (2) is/are at least partially shaped or arranged such that the curve (9) formed by the center line(s) (3) approximately satisfies the following parametric representation:

$$\partial(t) = \begin{pmatrix} (-1)^{[t]} a(t)(\cos(2\pi t) - 1) \\ c(t)t \\ a(t)\sin(2\pi t) \end{pmatrix}$$

the parameters and constants having the following meaning:

$\partial(t)$ position vector in a Cartesian coordinate system, t parameter along the curve (9), $-\infty \leq t \leq +\infty$,

[t] integral fraction of t, a(t) a radius of curvature (10), where $0 < |a(t)| < \infty$, c(t) a spacing parameter, where $0 < |c(t)| < \infty$.

20 Claims, 12 Drawing Sheets

CONTINUOUS, CHAOTIC CONVECTION MIXER, HEAT EXCHANGER AND REACTOR

BACKGROUND OF THE INVENTION

The invention relates to a device, in particular for mixing, for heat exchange or for carrying out reactions, having one or more through-flow elements which have a center line in the direction of flow. Devices of the said type are known, specifically as continuous, chaotic convection mixers or convection heat exchangers or convection reactors for Newton and non-Newton fluids.

In addition, a multiplicity of types of mixer/heat exchanger are also known. Static mixers have stationary built-in components at which the mixing operation is accelerated. In other types of mixer (mixing vessel, agitated tubular reactor), the mixing is undertaken by movable built-in components. Chaotic mixers and heat exchangers (J. Fluid Mech., 1989, Vol. 209, pp 335–357, Experimental Thermal and Fluid Science, 1993, Vol 7, pp 333–344, Wo 94/12270) use the secondary flows induced by inertia in curved tubes or channels for the purpose of mixing.

In the case of static mixers, recirculation zones can lead to deposits on the built-in components. Furthermore, overheating of the fluid (hot spots) can occur locally in the recirculation zones. Mixing systems with moving built-in components have the disadvantage that they are of more complicated construction than static mixers. As a rule, they require a drive and a controller. In the case of complex thermal and rheological fluids, effects such as local overheating and degradation of the fluid can occur because of the high shear rates at the agitating elements. In the known chaotic mixers (WO 94/12270), separation regions can occur on the basis of the flow guidance in the case of relatively large volumetric flows. It is then possible for deposits and local overheating to occur in said recirculation zones.

SUMMARY OF THE INVENTION

It was therefore the object of the invention to find a device of the type mentioned at the beginning which requires no built-in components and can be built simply and compactly. Furthermore, the aim is to be able to achieve a good mixing and heat exchanging effect—without the disadvantages discussed above—over a wide range of viscosity and volumetric flow.

This object is achieved according to the invention by means of a device of the type mentioned at the beginning, wherein the through-flow element(s) is/are at least partially shaped or arranged such that the curve formed by the center line(s) approximately satisfies the following parametric representation:

$$\partial(t) = \begin{pmatrix} (-1)^{[t]} a(t)(\cos(2\pi t) - 1) \\ c(t)t \\ a(t)\sin(2\pi t) \end{pmatrix}$$

the parameters and constants having the following meaning:
  $\partial(t)$ position vector in a Cartesian coordinate system,
  t parameter along the curve (9), $-\infty \leq t \leq +\infty$,
  [t] integral fraction of t,
  a(t) a radius of curvature (10), where $0 < |a(t)| < \infty$,
  c(t) a spacing parameter, where $0 < |c(t)| < \infty$.

The subject matter of the invention is thus a device, in particular for mixing, for heat exchange, or for carrying out reactions, having one or more through-flow elements which have a center line in the direction of flow, wherein the through-flow element(s) is/are at least partially shaped or arranged such that the curve formed by the center line(s) approximately satisfies the following parametric representation:

$$\partial(t) = \begin{pmatrix} (-1)^{[t]} a(t)(\cos(2\pi t) - 1) \\ c(t)t \\ a(t)\sin(2\pi t) \end{pmatrix}$$

the parameters and constants having the following meaning:
  $\partial(t)$ position vector in a Cartesian coordinate system,
  t parameter along the curve (9), $-\infty \leq t \leq +\infty$,
  [t] integral fraction of t,
  a(t) a radius of curvature (10), where $0 < |a(t)| < \infty$,
  c(t) a spacing parameter, where $0 < |c(t)| < \infty$.

In this case, a parameter range t for a through-flow element defines a so-called loop of 360° from one whole number to the next whole number, and a double loop to the next whole number but one.

A device is preferred which is composed of several loops. Connection of the loops can be produced by means of methods known to the person skilled in the art for detachable (flanges) or undetachable (welding, soldering) connections. It is also possible for the individual loops to be interconnected via known connecting pieces, straight or curved tubes. As many different devices according to the invention as desired can be produced in this way. a(t) and c(t) can vary or be the same along the curve or from loop to loop in such a device. In a preferred embodiment, one or each through-flow element and/or one or each loop satisfies the parametric representation exactly or partially exactly or completely.

Also preferred is an embodiment in which the through-flow elements are shaped or arranged such that the curve formed by the center line(s) satisfies the parametric representation over the entire device. The through-flow elements or the loops preferably have a circular, rectangular or elliptical cross section. They do not lie in one plane in space, but are arranged in space progressively, one behind another. The center line can be a line of symmetry as regards to the cross-sectional area. In the case of symmetrical or approximately symmetrical cross sections, curves which interconnect identical sites on the circumference of individual through-flow elements in the direction of flow, for example specific corners of individual elements in the case of square elements, are to be considered as equivalent to the curve from the center lines, i.e. said curves (edges in the direction of flow) likewise satisfy the parametric representation. Slight deviations of the curves from the parametric representation, particularly within the scope of normal production and/or assembly tolerances, are not deleterious.

The device can consist of one piece or be composed of several parts. The design and production can be performed in accordance with the well-established methods. As materials, consideration is given to all metallic or nonmetallic materials familiar to the person skilled in the art, depending on the design and type of the flowing fluids: plastics, steels (stainless or acid-resistant), glass, ceramic or special materials.

The multiples of the diameter of the tube specified in German DIN 2605 T1 are preferably used as radii of curvature a(t) of the center line. A typical design consists, for example, of a tube with the outside diameter D=40 mm. Design 5 of the standard uses a bending radius of 100 mm.

A lead (spacing parameters c(t)) of 100 mm per loop of 360° then proves to be advantageous. The number of loops is determined by the mixing task. A typical number of loops is 4 to 8. The wall thicknesses d are usually in the range from 0.5 to a few mm, in the case of extreme pressures up to 10 mm and more. In particular embodiments, the or each through-flow element has an outside diameter D in the range from 1 to 200 mm, preferably 5 to 100 mm, particularly preferably 10 to 50 mm, and the radius of curvature a(t) is selected from the range from 1*D to 7*D, preferably 2*D to 5*D. The spacing parameter c(t) is advantageously selected from the range from −20*D to +20*D, preferably −10*D to +10*D, particularly preferably from −5*D to +5*D, it being the case that it is always ≠0.

The advantages of the device according to the invention are to be seen essentially in that it is of simple design and easy to produce, and in that no separation regions occur in the flow guidance. A further important advantage is that a very compact design is produced on the basis of the law of formation. By contrast with static mixers with built-in components, the device according to the invention can be cleaned easily, for example using go-devils. By contrast with the chaotic mixer disclosed in WO 94/12270, the device according to the invention has the advantage that it can be effectively assembled to form compact modules, for example in multipath heat exchangers. Such an arrangement also results, moreover, in an improved heat exchange for the casing fluid owing to a large incident flow surface and intensive vortexing.

BRIEF DESCRIPTION OF THE DRAWINGS

Novel features and advantages of the present invention in addition to those mentioned above will become apparent to persons of ordinary skill in the art from a reading of the following detailed description in conjunction with accompanying drawings wherein similar reference characters refer to similar parts and in which.

DETAILED DESCRIPTION OF THE INVENTION

Figure 2:
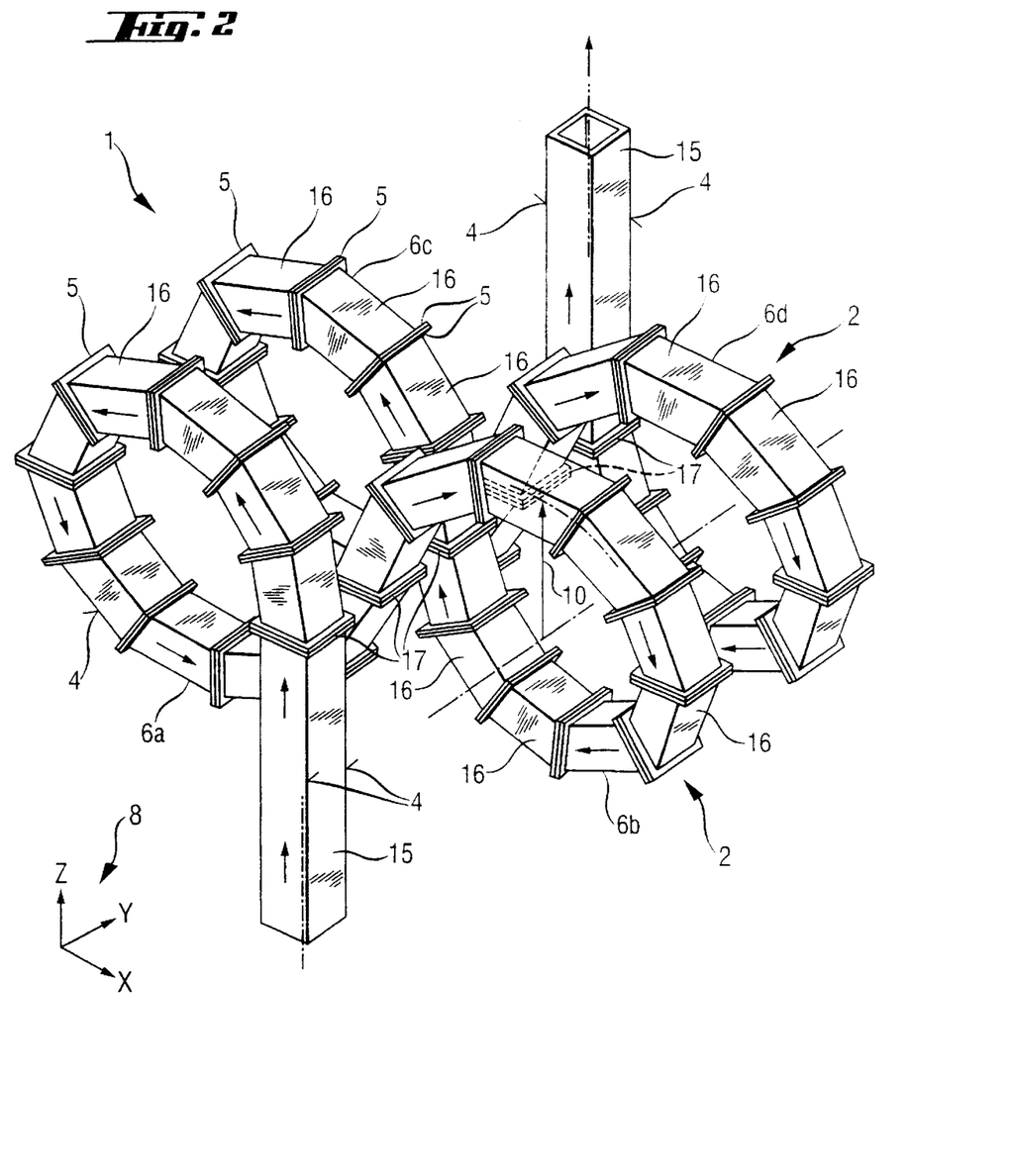
FIG. 2 is a perspective view of another device, according to the present invention.
Figure 3:
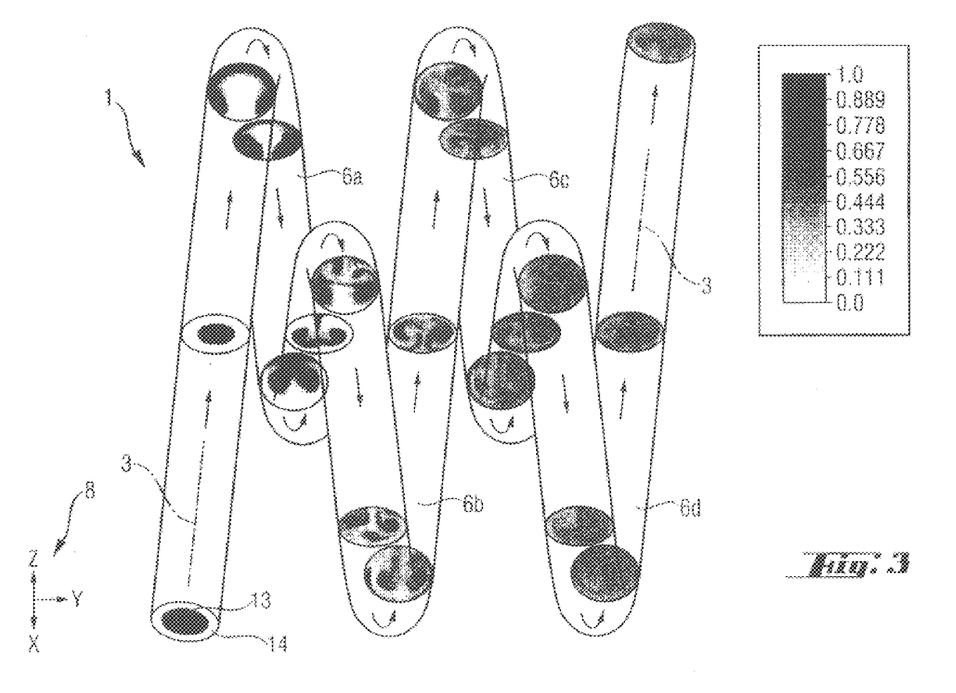
FIG. 3 is a diagrammatic view illustrating mixing two fluids of different viscosities, according to the present invention.

The device according to the invention is further explained below with the aid of the exemplary embodiments represented perspectively in FIGS. 1, 2, 5, 6. FIG. 3 shows the result of a numerical experiment, and FIG. 4 a detail from FIG. 2 in cross section. There is no intention to limit the invention in any way, in particular to these embodiments.

Figure 1:
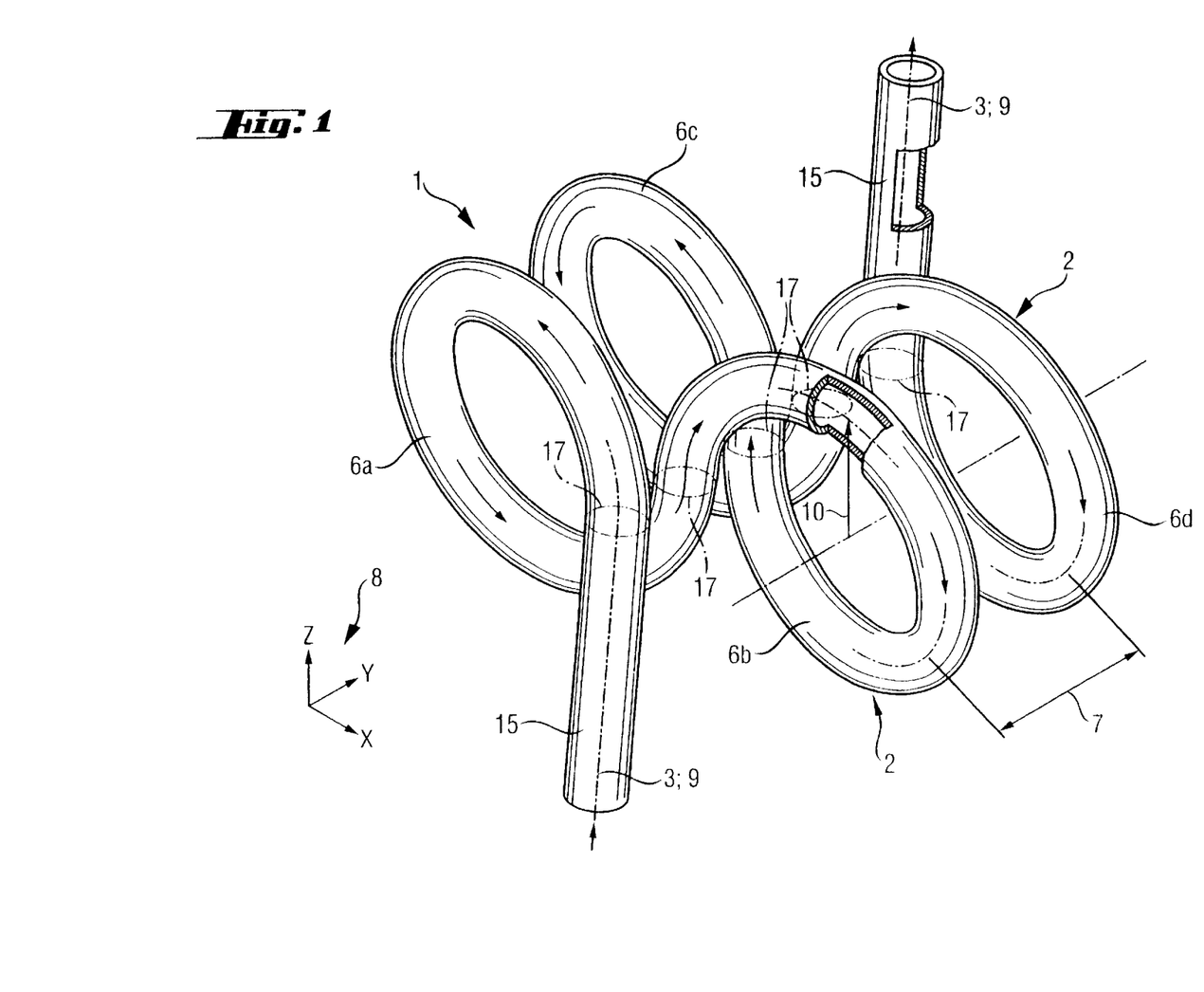
FIG. 1 is a perspective view of a device according to the present invention.
Figure 4:
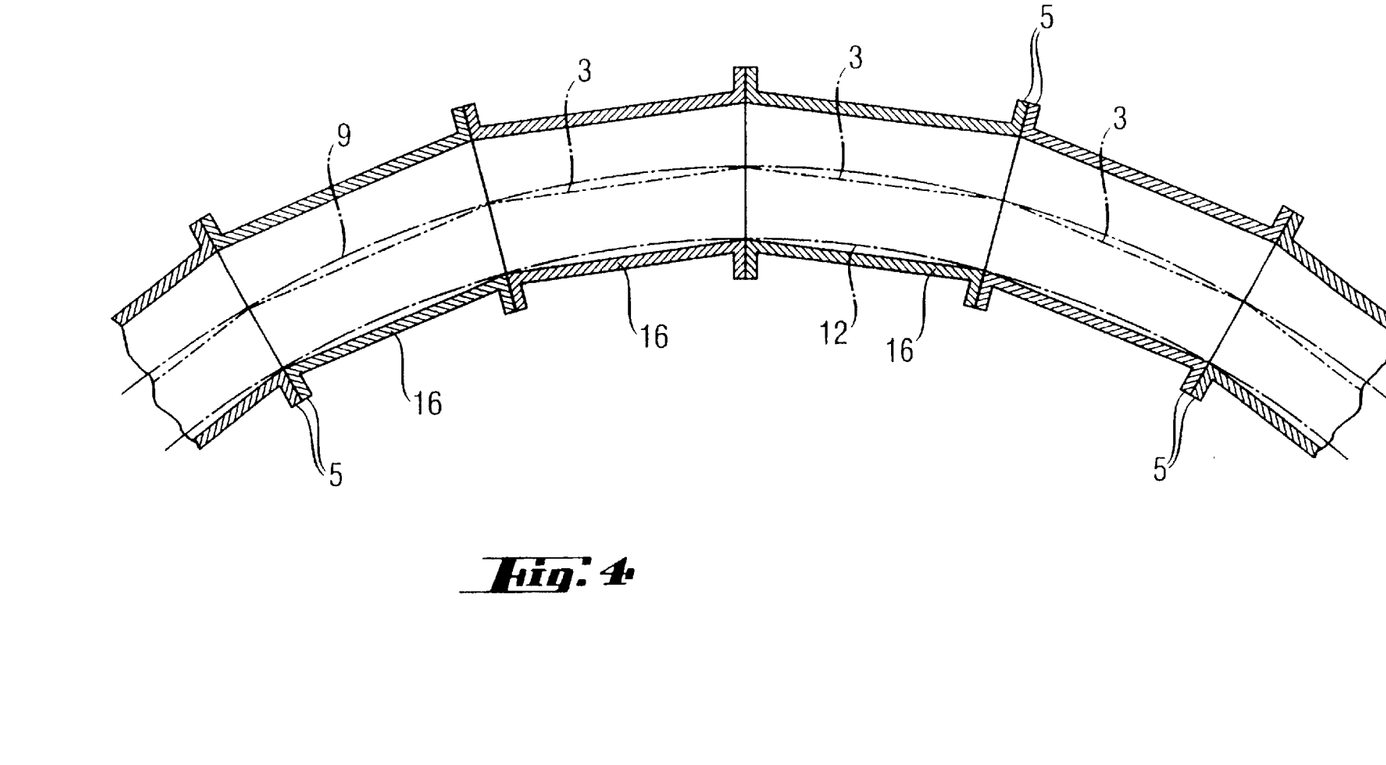
FIG. 4 is a cross-sectional view of a portion of a device shown in FIG. 2.

FIG. 1 shows the device 1 according to the invention, which is formed from a single tube 2 with a circular cross section, which has a center line 3 in the direction of flow (arrow) which forms a curve 9. Also illustrated is a Cartesian coordinate system 8 with the spatial directions x,y and z. However, the device 1 can also be conceived as being reduced to four loops 6a, 6b, 6c, 6d and two straight tubes 15, the loops 6 being arranged alternately offset one behind another. Straight tubes 15 are added at the beginning and end of the loop arrangement. Dividing lines 17 drawn in mark the transitions between the individual loops 6 and tubes 15. The spacing of the loops 6a, 6c and 6b, 6d situated one behind another is represented by a distance 7 which corresponds in the illustrated case to 2*c(t), i.e. double the lead. The projection of the curve 9 of the circular elements 6a, 6b, 6c, 6d onto the xz plane characterizes the radius a(t) 10, which can also vary along the curve. In FIG. 2, the device 1 comprises, at least partially, individual through-flow elements 16 with a rectangular cross section, which are interconnected via flanges 5. FIG. 4 shows a cross section through such a detail. It is shown here how the center lines 3 of the elements 16 form a curve 9. Likewise represented is a curve 12 which is equivalent to the curve 9 and connects corner points of the individual elements 16. In the case of a correspondingly shaped or bent square element 16, an edge 4 of said element 16 can also form a curve 9 which is equivalent to the center line 3 and satisfies the parametric representation.

FIG. 3 shows the result of a numerical experiment for mixing two fluids 13, 14 whose viscosities differ by a factor of five, for example HCl 13 and water glass 14, in the device 1 represented in FIG. 1. In this example, the initial condition was selected so that the low-viscosity fluid 13 (HCl) is located in the core, and the fluid 14 (water glass) of higher viscosity is located in the outer region of the inlet (bottom left). The gray levels represented in the legend mark the concentration (volumetric fractions, black=1, white=0) of the low-viscosity fluid 13. It is clearly to be seen that the mixing operation makes progress in the chaotic mixing elements, i.e. in the loops 6. Effective thorough mixing has already been set up in this case after the traversal of three loops 6. The concentration of the two fluids is approximately uniform over the entire cross section, approximately at 0.5.

Figure 5:
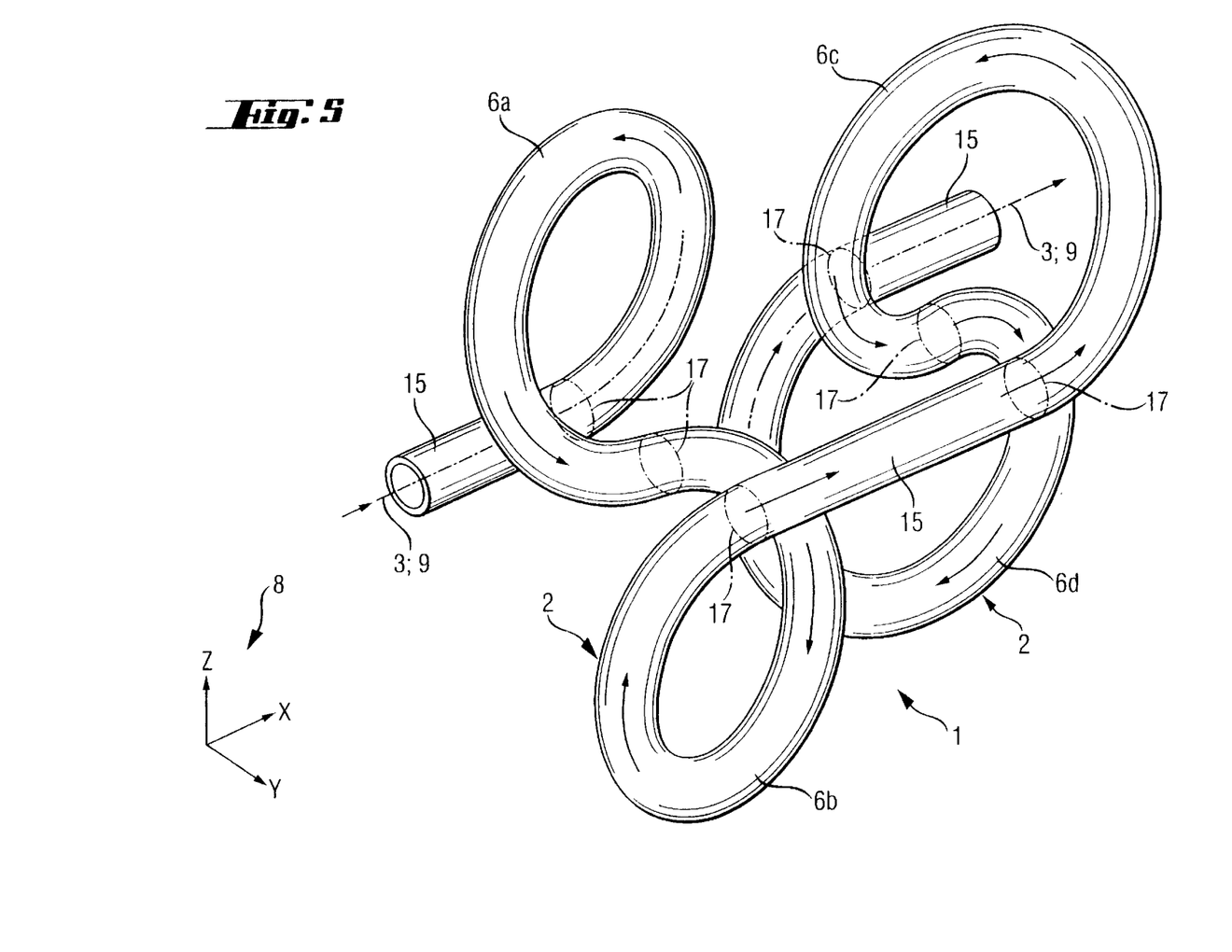
FIG. 5 is a perspective view of still another device, according to the present invention.

FIG. 5 shows a preferred embodiment of the device 1 according to the invention, in which two loop pairs 6a,b and 6c,d are connected by means of a straight pipe 15. In the further preferred embodiment in accordance with FIG. 6, loop pairs 6a,b and 6c,d are connected by means of S-shaped tube lengths 18. The person skilled in the art can thereby produce in a simple way virtually any number of different, compact chaotic convection mixers which mix very effectively.

Figure 6:
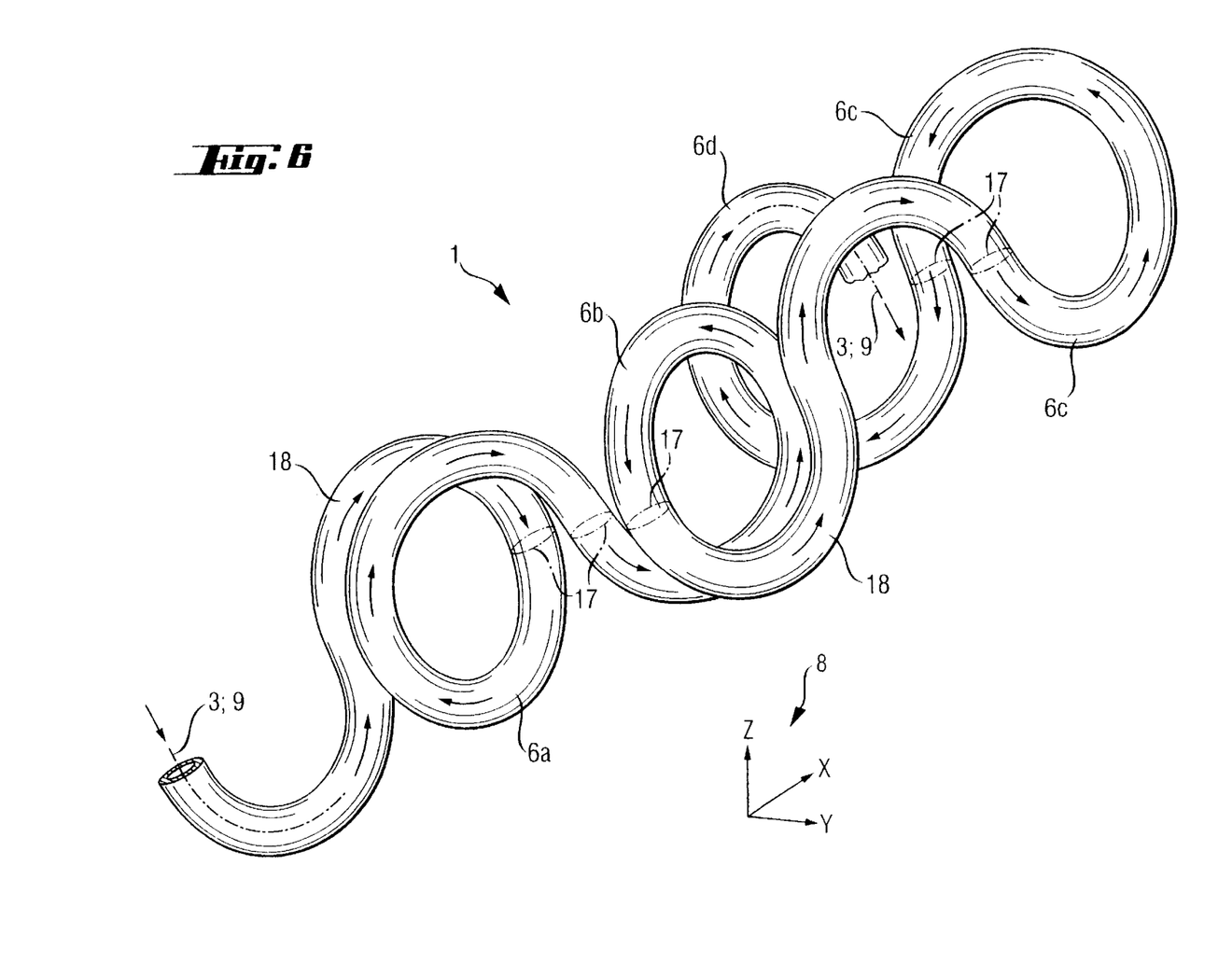
FIG. 6 is a perspective view of another device, according to the present invention.

In the following, mixers according to the invention, as represented in FIGS. 1, 5 and 6, are characterized by way of example with the aid of three sets of parameters. No limitation is thereby intended.

FIG. 1

| loop | t | a(t) | c(t) |
|------|-----|------|------|
| 6a | 0–1 | 5*R | 3*R |
| 6b | 1–2 | 5*R | 3*R | inside radius R = 1 mm (R = (D − 2*d)/2)

FIG. 5

| loop | t | a(t) | c(t) |
|------|-----|------|------|
| 6a | 0–1 | 5*R | 5*R |
| 6b | 1–2 | 5*R | 5*R |
| 6c | 0–1 | 5*R | −5*R |
| 6d | 1–2 | 5*R | −5*R | inside radius R = 20 mm; the loops 6b and 6c are connected by a straight element (tube 15).

FIG. 6

| loop | t | a(t) | c(t) |
|------|-----|------|------|
| 6a | 0–1 | 5*R | 5*R |
| 6b | 1–2 | 5*R | 5*R |
| 6c | 0–1 | 5*R | −5*R |
| 6d | 1–2 | 5*R | −5*R | inside radius R = 20 mm; the loops 6b and 6c are connected by an element (tube 18) curved in the shape of an S.

The object of the invention is, furthermore, a method for producing a device according to the invention in which a tube is bent around [t] cylindrical molded parts which are arranged alternately, to form two mutually parallel columns, a guide groove with the radius of curvature a(t) and a lead ½* c(t) being recessed into each molded part on the circumference, and the tube being bent around the first molded part of the first column and subsequently around the first molded part of the second column, and subsequently the further molded parts being alternately plugged onto the first and second columns, and the tube being bent around said further molded parts.

The object of the invention is, furthermore, a device for carrying out said method, having a base plate on which at least two cylindrical molded parts are arranged parallel to one another at a spacing (b) to form two columns, the at least two cylindrical molded parts having on the circumference a guide groove with a radius of curvature a(t) and a lead of ½* c(t) for bending the tube, and being able to be plugged together individually to form the columns.

These objects are described in more detail below with the aid of FIGS. 7 to 10. No limitation of any kind is thereby intended.

In order to guide the flow in and around a double loop 6a, 6b of the device 1 according to the invention in accordance with claim 1—termed "chaotic mixer" or "CM" below—, it is advantageous to produce said device without joining techniques. For this purpose, a length of tube 2 is brought onto the length of the mixing path and suitably shaped in a modularly configured bending device 22.

The bending device 22 comprises, inter alia, several preferably cylindrical molded parts 23 which can be plugged into one another and are arranged to form two columns 29, 32 extending parallel to one another. The number of molded parts 23 is equal to the number [t] of the loops 6a, 6b . . . The columns 29, 32 made from molded parts 23 are fastened to a base plate 30 at a spacing b from one another. A guide groove 31 which advantageously has at least a quarter of the tube cross section, preferably half the tube cross section, with a lead of ½* c(t) is recessed, for example by milling or via a casting method, into the molded parts 23 on the circumference for the purpose of guiding the tube 2 during bending. The molded parts 23 can be plugged into one another and rotated with respect to one another, with the result that the transition of the guide groove 31 (milling) from a first molded part 23 on a first column 29 to the following one on the second column 32 is smooth. For this reason, the first molded part 23 of the second column 32 or its groove 31 is raised by the measure corresponding to the lead. The molded parts 23 have a complete groove 31 of at least 90°, preferably 180°, 360° being particularly preferred.

Two types of molded parts are required to bend a CM 1 according to FIG. 1: a) left-hand helical ones and b) right-hand helical ones, i.e. the lead of the guide groove 31 of the molded parts 23a) has the opposite sign to that of b).

In each case, one type (a), or b)) occurs in a column 29, 32 of molded parts 23 plugged into one another. As a result, after the tube 2 is bent around the molded parts 23a) and b), a double loop 6a, 6b is produced in the shape of an eight and having a defined lead. Depending on the mutual spacing b of the columns 29,32, the shape of the double loops 6a, 6b can deviate from the shape shown in FIG. 1.

Figure 7:
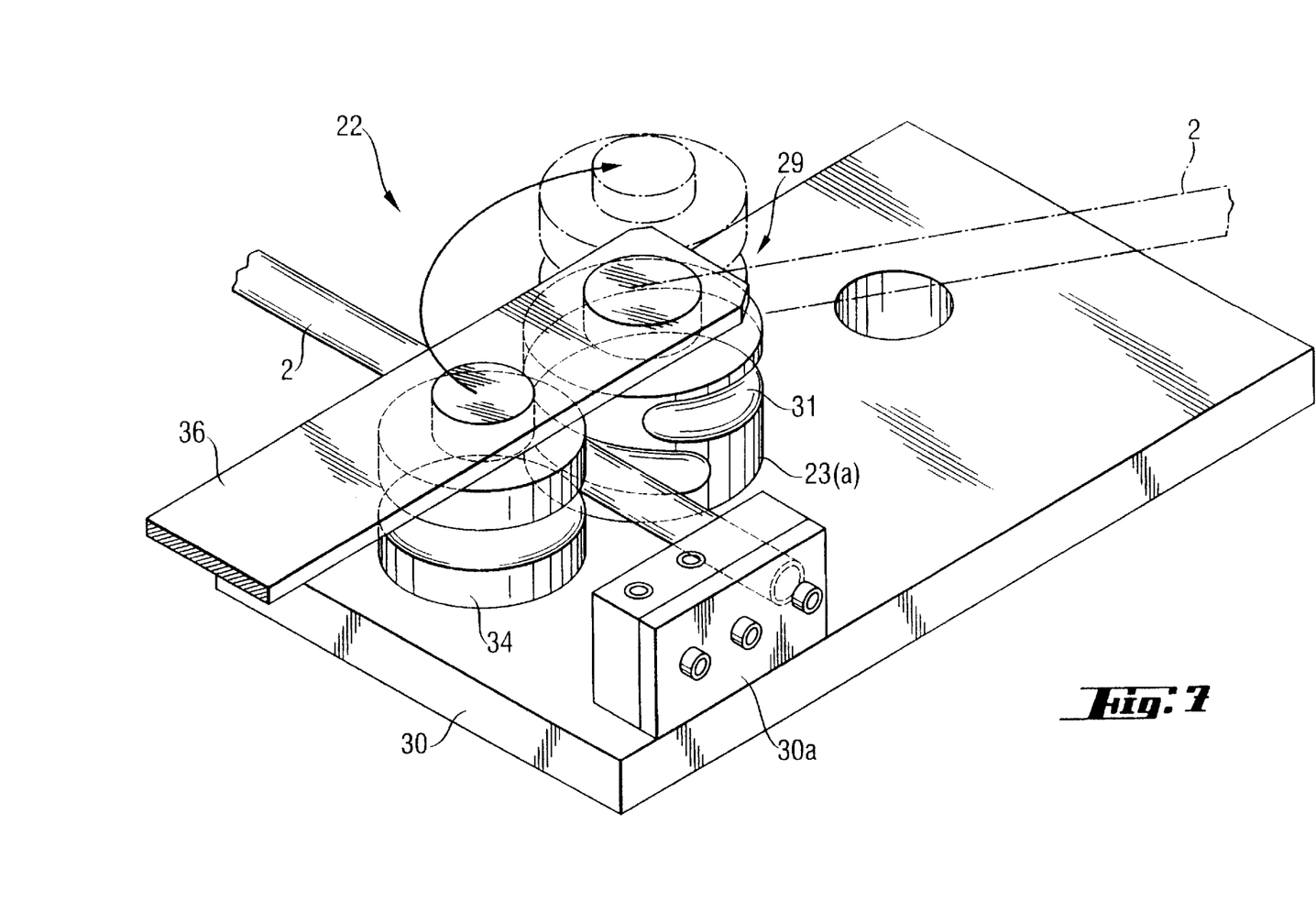
FIG. 7 shows a perspective representation of the bending device according to the invention with a tube at the start of the bending operation.

The bending operation is as follows:

The tube end starting from which the bending operation of a CM element is to proceed is fixed to the base plate 30 by means of a bearing 30a (FIG. 7).

Figure 8:
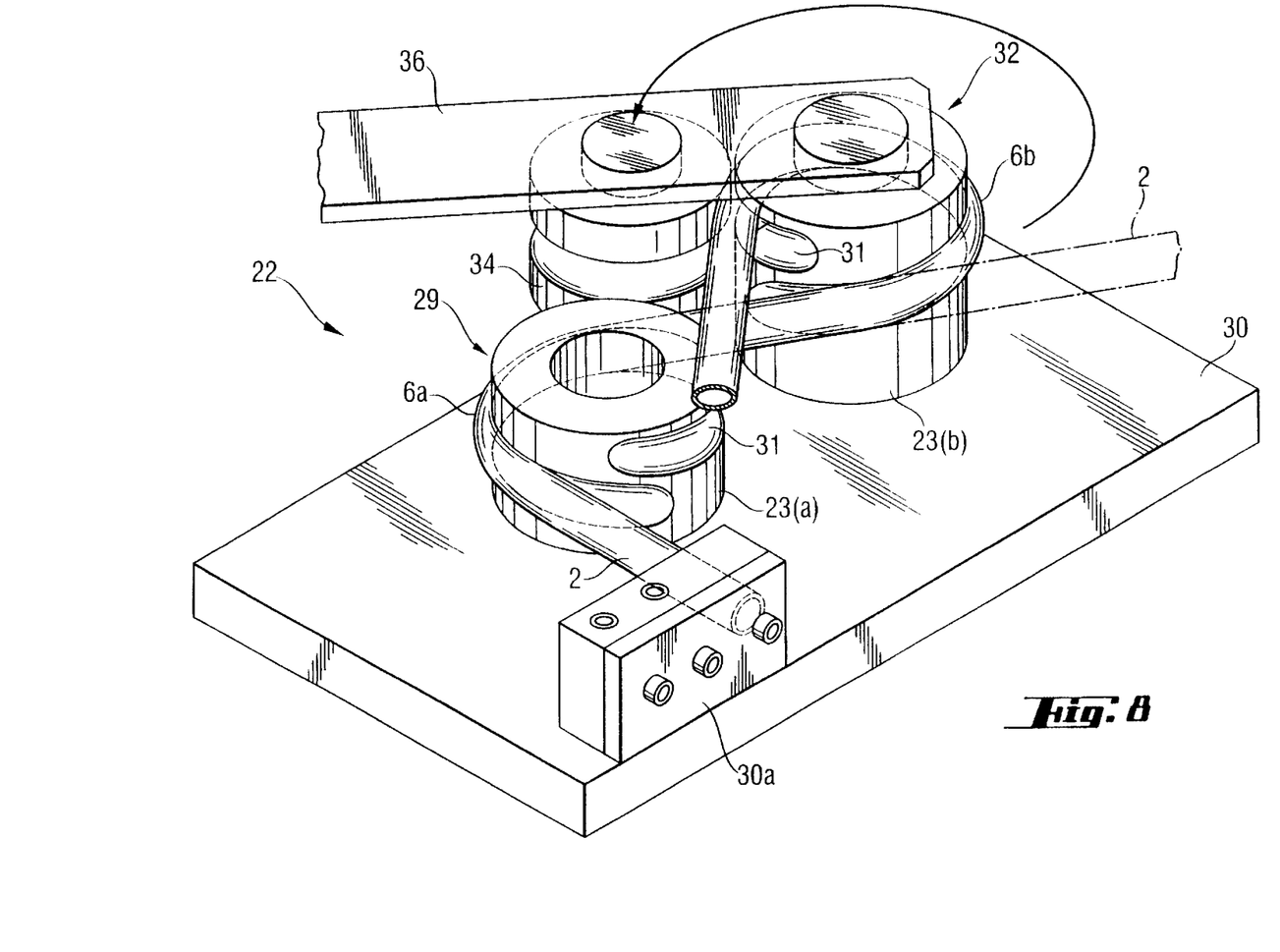
FIG. 8 shows a perspective representation of the bending device according to the invention with a tube after a loop has been bent.
Figure 9A:
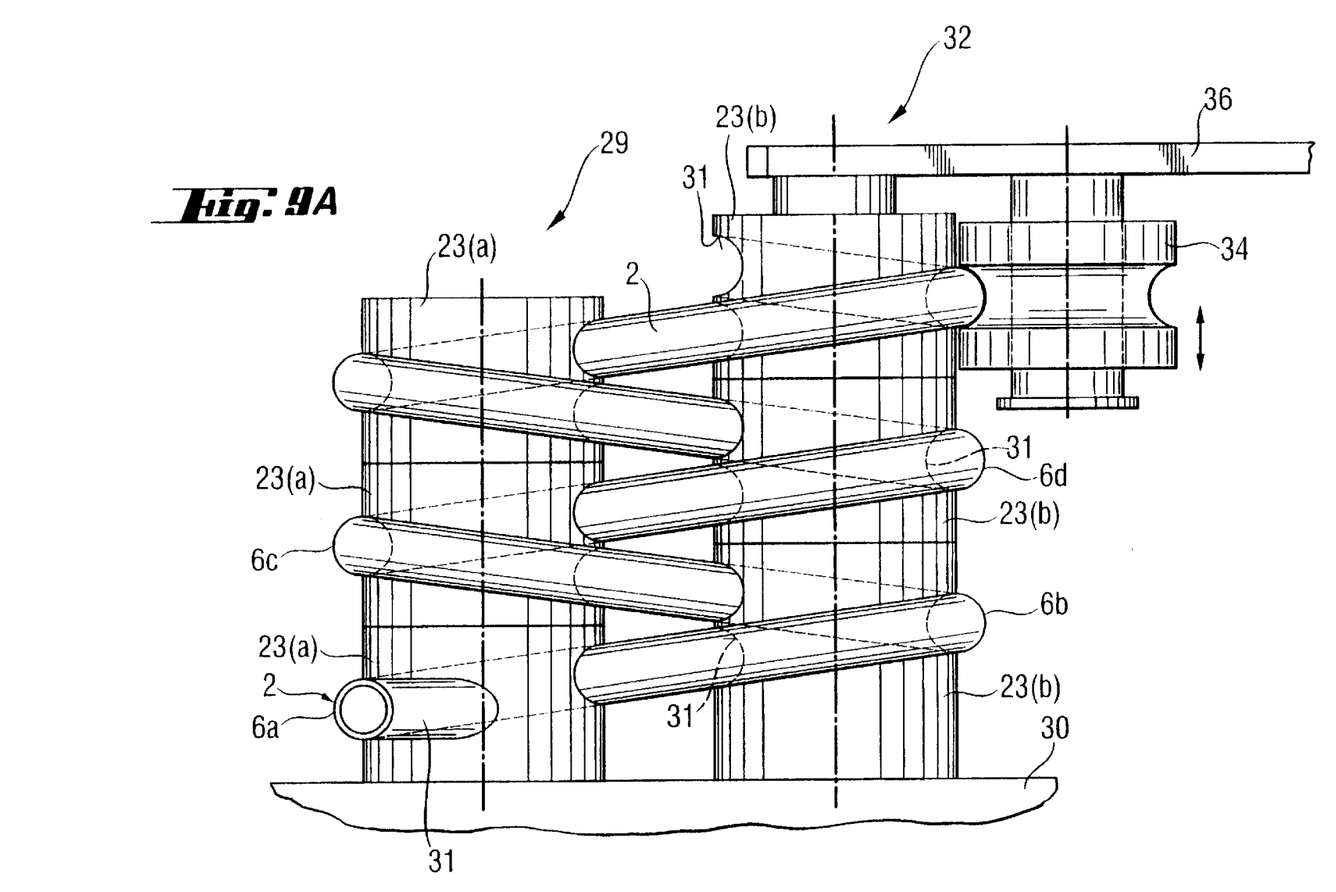
FIGS. 9A, B shows a representation of the bending device according to the invention, with two columns per three molded parts each, in a side view and in a sectional side view.
Figure 9B:
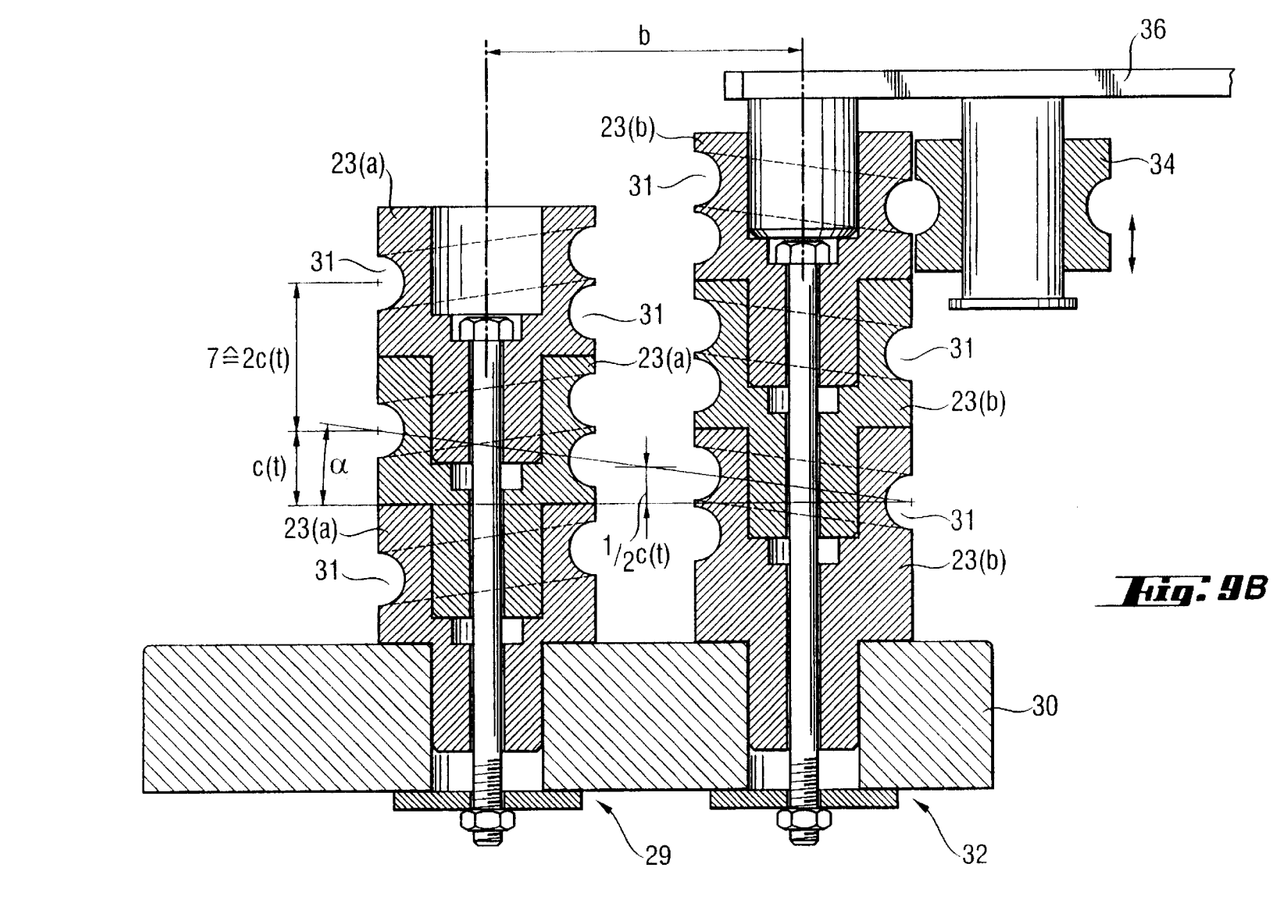
Figure 10:
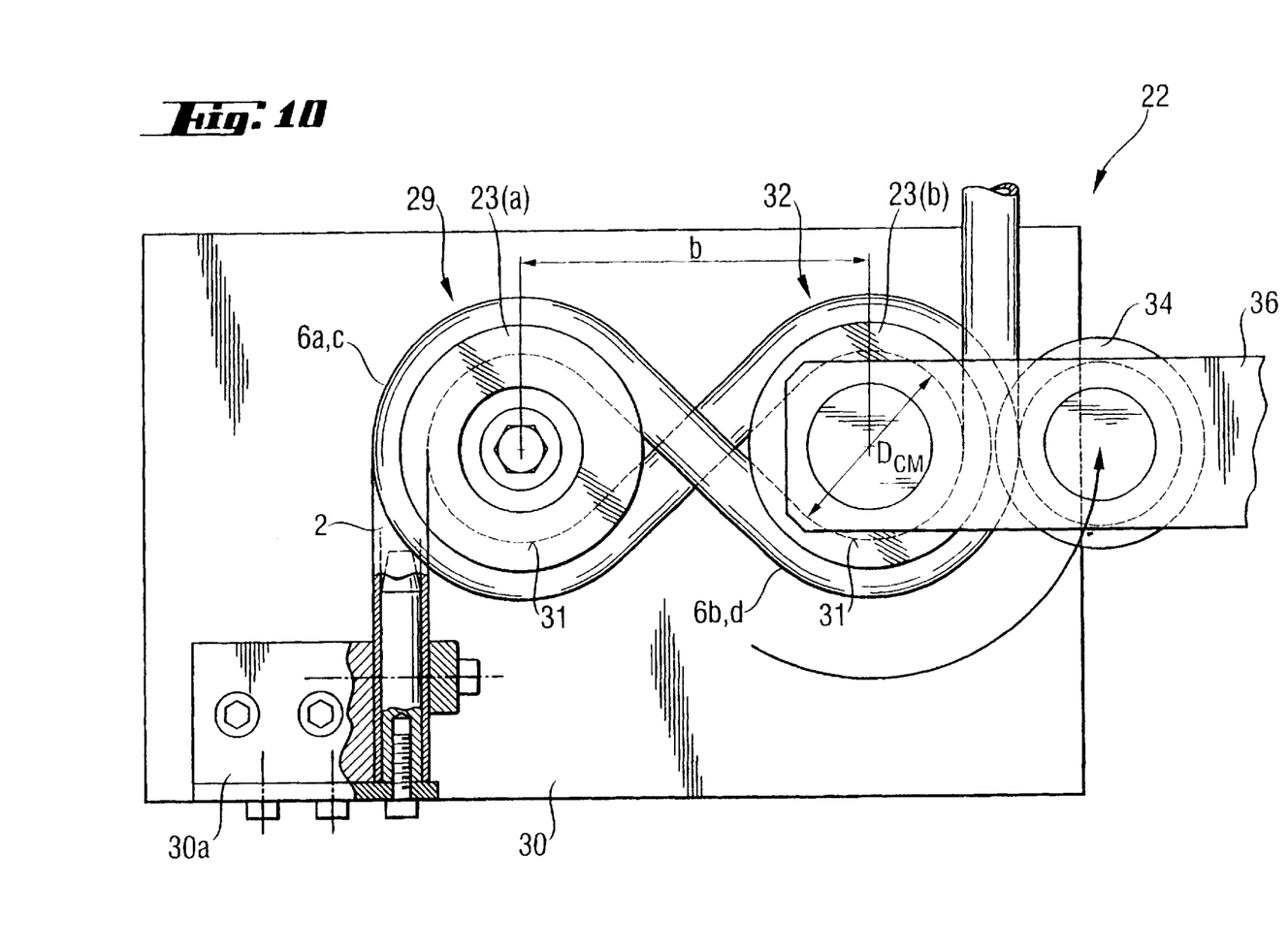
FIG. 10 shows a representation of the bending device according to the invention, in plan view.

The tube 2 is bent around the molded part 23a) with the aid of a guide roller 34 which is fastened to a lever 36, the lever 36 being plugged onto the upper end of the column 29 of molded parts 23a), and being capable of displacement in height. After the tube 2 has been bent sufficiently around said molded part 23a) (FIG. 7, dashed and dotted), a molded part 23b) is plugged onto the column 32. The lever 36 is likewise plugged on the top of column 32, and the tube 2 is then bent further in the other direction (FIG. 8). It is to be borne in mind in this operation that before it is bent further the tube 2 bears without any pressure against each newly plugged-on molded part 23, or lies without any pressure in the guide groove 31 thereof, since otherwise deformations of the entire CM element occur when the molded parts 23 are taken out. The tube is thus to be deformed beyond the elastic range. Subsequently, a further molded part 23a) is plugged together with the lever 36 onto the column 29, and bent further as previously described. These operations are repeated until the desired number of loops 6a, 6b . . . . have been produced.

After termination of the entire bending operation, the molded parts 23 are screwed out of the CM element. Owing to this mode of procedure, the molded parts 23 can be repeatedly used as matrices and can be used to produce several, identical CM elements 6a, 6b . . . . The first molded part 23 into which the tube 2 is inserted differs from the remainder in that the guide groove 31 extends a little horizontally at the start and makes a transition to the required lead only later, on the circumference. This greatly improves the insertion of the tube 2 into the molded part 23.

The following points remain to be considered:

The tube inside and outside diameters are to be selected in accordance with the requirements. They can have an outside diameter ranging from 2 mm to 500 mm.

Corrosion-resistant metals or suitable plastics satisfying the requirements are to be selected as tube material, it being necessary, as the case may be, for plastic tubes to be heated for the bending operation.

The molded parts 23 should be produced from a suitable material which does not lead to problems with the material of the tube during the bending operation such as, for example, corrosion.

The tube cross section should not be deformed substantially because of the bending operation. A circular cross section is ideal. Slight deviations can be tolerated.

If the CM is pressure-loaded during operation, it is to be ensured that the thermal load during bending does not depress the strength too strongly.

The tube should be filled with a suitable filler during bending.

Transitions from the bent tube to a straight length of tube should be configured without discontinuity such as kinks, that is to say tangentially.

The columns 29, 32 made from molded parts 23 plugged into one another are to be held in a base plate 30 of suitable thickness. The spacing b between the columns 29, 32 is determined, inter alia, by the dimensions and bending properties of the tubes used.

The principal dimensions of the CM elements can lie within the following ranges: spacing b: 10 mm to 5000 mm, diameter $D_{CM}$: 5 mm to 3000 mm, lead angle a, which is correlated with the lead c(t), (FIG. 9B), per molded part 23:1 to 60 degrees.

The advantages of this method according to the invention are to be seen essentially in that it is possible, by virtue of the modular design and the reciprocating way in which the molded parts are plugged on relative to a column, for tubes of "arbitrary" length to be bent in endless fashion to form chaotic mixers.

Figure 11:
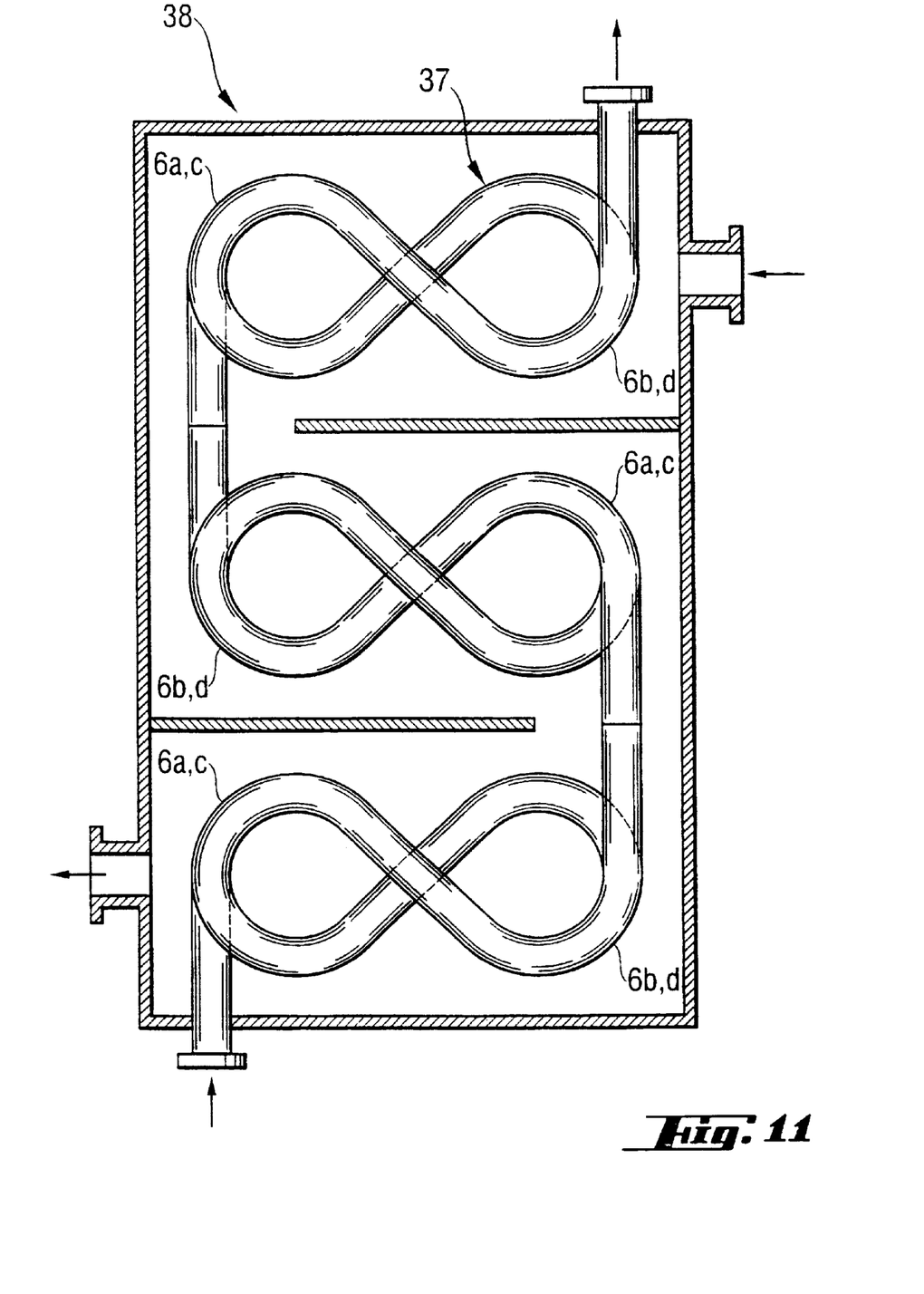
FIG. 11 shows a heat exchanger with double loops produced in accordance with the invention.

FIG. 11 shows by way of example how three cm elements 37 produced according to the invention can be assembled to form a compact, effectively operating heat exchanger 38.

What is claimed is:

1. A device (1), in particular for mixing, for heat exchange or for carrying out reactions, having one or more through-flow elements (2) which have a center line (3) in the direction of flow, wherein the through low element(s) (2) is/are at least partially shaped or arranged such that the curve (9) formed by the center line(s) (3) approximately satisfies the following parametric representation:

$$\partial(t) = \begin{pmatrix} (-1)^{[t]} a(t)(\cos(2\pi t) - 1) \\ c(t)t \\ a(t)\sin(2\pi t) \end{pmatrix}$$

the parameters and constants having the following meaning:
$\partial(t)$ position vector in a Cartesian coordinate system (8),
t parameter along the curve (9), $-\infty \leq t \leq +\infty$,
[t] integral fraction of t,
a(t) a radius of curvature (10), where $0<|a(t)|<\infty$,
c(t) a spacing parameter, where $0<|c(t)|<\infty$.

2. The device as claimed in claim 1, wherein the curve (9) completely satisfies the parametric representation for one or more through-flow elements (2), t running from 0 to 1.

3. The device as claimed in claim 1, wherein the curve (9) completely satisfies the parametric representation for one or more through-flow elements (2), t running from 1 to 2.

4. The device as claimed in claim 1 wherein the or each through-flow element (2) has an outside diameter D in the range from 1 to 200 mm, and a(t) is selected from the range from 1*D to 7*D.

5. The device as claimed in claim 4, wherein the or each through-flow element (2) has an outside diameter D in the range of 5 to 100 mm, and a(t) is selected from the range of 2*D to 5*D.

6. The device as claimed in claim 1 wherein the or each through-flow element (2) has an outside diameter D in the range from 1 to 200 mm, and c(t) is selected from the range from −10*D to +10*D.

7. The device as claimed in claim 6, wherein the or each through-flow element (2) has an outside diameter D in the range of 5 to 100 mm, c(t) is selected from the range of −5*D to +5*D.

8. The device as claimed in claim 1 wherein the one or more through-flow elements (2) has or have an elliptical or rectangular or circular or square cross section.

9. The use of a device as claimed in claim 1 for mixing or for heat exchange or for carrying out reactions.

10. A method for producing a device (1) as claimed in claim 1, in which a tube (2) is bent around [t] cylindrical molded parts (23) which are arranged alternately, to form two mutually parallel columns (29, 32), a guide groove (31) with the radius of curvature (10) a(t) and a lead ½* c(t) being recessed into each molded part (23) on the circumference, and the tube being bent around the first molded part (23) of the first column and subsequently around the first molded part (23) of the second column, and subsequently the further molded parts (23) being alternately plugged onto the first and second columns, and the tube being bent around said further molded parts (23).

11. The method as claimed in claim 10, wherein the molded parts (23) can be rotated on the columns (29, 32).

12. The method as claimed in claim 10, wherein the or each molded part (23) has a guide groove (31) of at least a quarter of the tube cross section.

13. The method as claimed in claim 10, wherein the lead of the guide groove (31) of the or each molded part (23) of the second column has the opposite sign to the lead of the guide groove (31) of the or each molded part (23) of the first column.

14. A device (22) for carrying out the method as claimed in claim 10, having a base plate (30) on which the at least two cylindrical molded parts (23) are arranged parallel to one another at a spacing (b) to form the two columns (29,32), the at least two cylindrical molded parts (23) having on the circumference a guide groove (31) with a radius of curvature (10) a(t) and a lead of ½* c(t) individually to form the columns (29, 32).

15. The device as claimed in claim 14, wherein the molded parts (23) can be rotated on the columns (29, 32).

16. The device as claimed in claim 14, wherein the lead of the guide groove (31) of the molded parts (23) on the first column has a different sign to that on the second column.

17. The device as claimed in claim 1, wherein the curve (9) completely satisfies the parametric representation for one or more through-flow elements (2), t running from a whole number to the next whole number.

18. The device as claimed in claims 1, wherein the parameter range t defines a loop.

19. The device as claimed in claim 1, wherein the parameter range t defines a double loop.

20. The device as claimed in claim 19, including at least several double loops.

* * * * *

UNITED STATES PATENT AND TRADEMARK OFFICE
CERTIFICATE OF CORRECTION

PATENT NO. : 6,331,072 B1
DATED : December 18, 2001
INVENTOR(S) : Wilfried Schierholz, Götz Lauschke, Stefan Ott, Ulrich Schmidt and Peter Hein It is certified that error appears in the above-identified patent and that said Letters Patent is hereby corrected as shown below:

<u>Column 7,</u>
Line 41, delete "low" and insert -- flow --.

Signed and Sealed this

Thirtieth Day of April, 2002

*Attest:*

JAMES E. ROGAN
*Director of the United States Patent and Trademark Office*

*Attesting Officer*